May 8, 1962 — A. ZAHA — 3,033,593
AUTOMOTIVE TRAILER
Filed Aug. 8, 1960 — 2 Sheets-Sheet 1
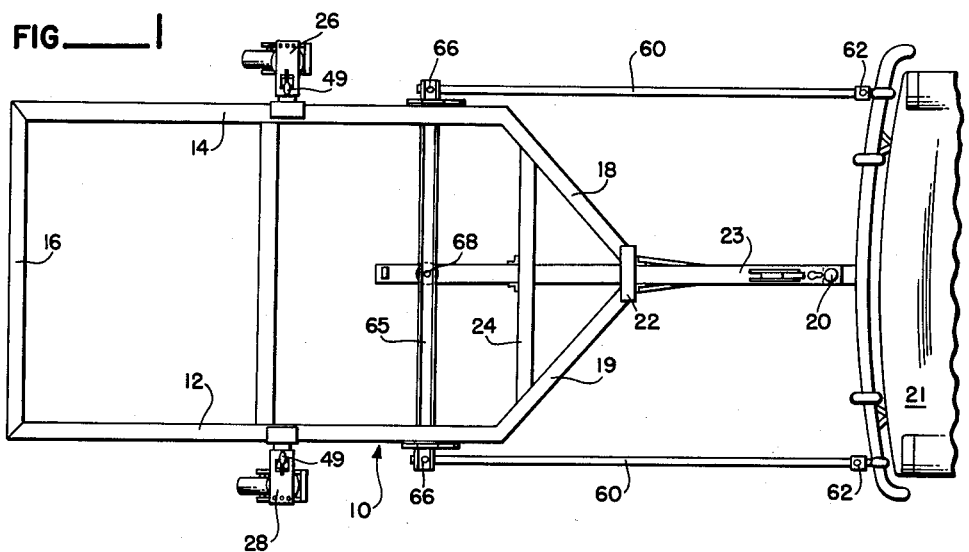
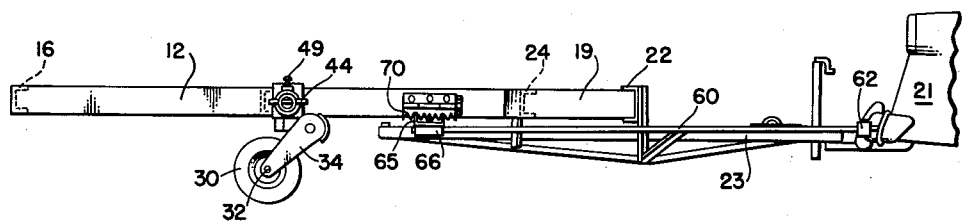
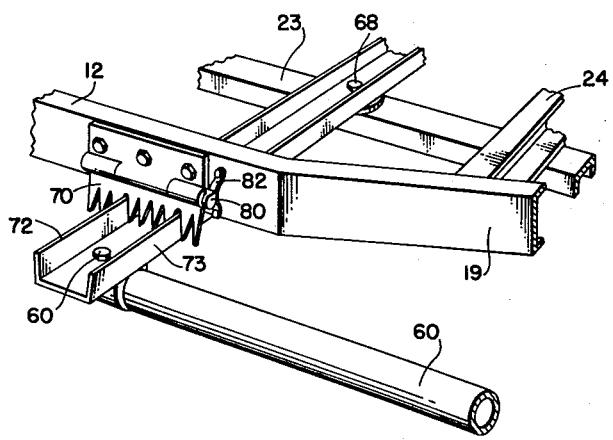
ABE ZAHA
*INVENTOR.*
BY Smith & Tuck May 8, 1962  A. ZAHA  3,033,593
AUTOMOTIVE TRAILER Filed Aug. 8, 1960  2 Sheets-Sheet 2

INVENTOR.
ABE ZAHA
BY
Smith & Tuck

United States Patent Office 3,033,593
Patented May 8, 1962

3,033,593
AUTOMOTIVE TRAILER
Abe Zaha, Rte. 2, Box D-83, Pendleton, Oreg.
Filed Aug. 8, 1960, Ser. No. 48,020
5 Claims. (Cl. 280—460)

This present invention relates to the general art of automotive trailers intended for towing or maneuvering by automotive vehicles. More particularly, this trailer is intended to be mounted on wheels capable of swivel action about a substantially vertical axis and to be provided with means which will hold the wheels in a locked position most suitable for forward travel on a highway and then to be selectively capable of being unlocked so that the wheels may be free to swivel and thus greatly facilitate the backing of the trailer when it is powered by an automotive vehicle.

Trailers for towing behind automobiles and the like are coming into very wide usage. Much of the use is by persons of limited experience in handling trailers and these people often have great difficulty and sometimes damage their trailers or automobiles during the backing operation. Many known attempts have been made to supply means which will make possible greater facility in maneuvering the trailer while backing. One example of such construction is embodied in my co-pending patent application, Serial Number 759,266, now United States Letters Patent No. 2,949,317.

In this present application every endeavor has been made to provide means for safely handling trailers mounted on swiveling wheels and to further provide a mechanism that is relatively simple to use, certain in its operation and which can be very cheaply made. There are many occasions when it is very desirable to push a trailer ahead of a vehicle. This is especially true in launching or loading boats from trailers where it is very desirable to keep the rear wheels of the vehicle on firm footing and to have the trailer and its load within very convenient observation at all times. This present trailer is particularly well adapted to such usage.

The principal object of this present invention therefore is to provide a simple means for controlling an automotive trailer which is mounted on swivel wheels.

A further object of this invention is to provide an automotive trailer mounted on a plurality of swiveling wheels by means of rigid longitudinal members which are connected at one end to a transverse bar pivoted on the trailer frame and at the other end to the outer extremities of an automotive member.

A further object of this present invention is to provide means for locking the swivel wheels against rotation when the automobile is driven forward and to provide means for unlocking the wheels so that they may pivot when the vehicle is being backed.

A further object of this invention is to provide coacting means on said transverse bar and a comb type locking means secured on the automotive frame for use when backing the trailer.

Other objects, advantages and capabilities will be apparent from the disclosure in the drawings or may be comprehended or are inherent in the device.

In the drawings:

FIGURE 1 is a plan view of the frame of an automotive trailer embodying the principles of this invention and showing the same as secured to the rear of an automobile.

FIGURE 2 is a side elevation of the showing of FIGURE 1.

FIGURE 3 is a perspective view, in fragmentary form, showing the comb and bar locking means.

Figure 4:
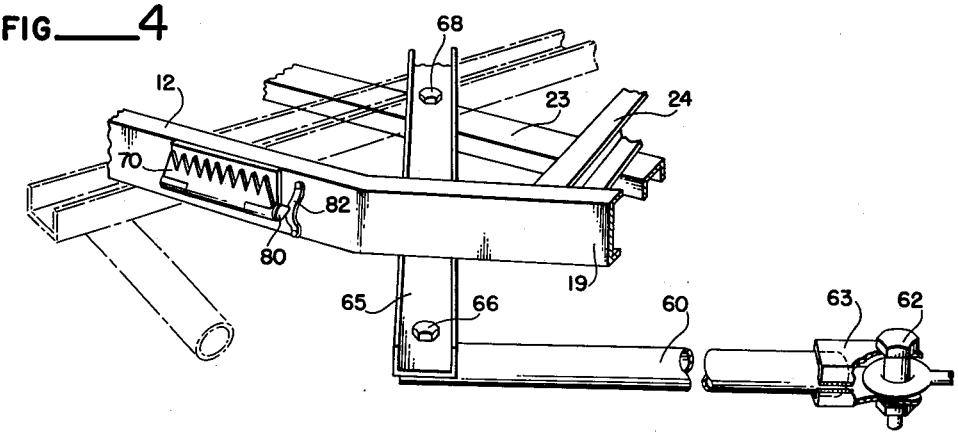
FIGURE 4 is a fragmentary perspective view similar to FIGURE 3 but showing the comb and bar locking means in its unlocked position and illustrating in dash and dot lines an extreme position of certain of the parts such as might occur in going forward around a curve.

Referring to the drawings and particularly to FIGURE 1, the numeral 10 designates generally an automotive frame of the type to which this invention may be readily applied. A frame of this order usually is provided with parallel side members 12 and 14, a rear end member 16, and diagonally positioned front members as 18 and 19. A trailer hitch is provided at 20 for attachment to the automotive vehicle 21. This hitch is normally mounted upon a reach pole 23 suitably secured to the frame 10 as by juncture means at 22 and the cross member 24 of the trailer. Trailer frame 10 is supported by some form of selectively lockable, swivel wheels as 26 and 28. These wheels are shown in greater detail in FIGURE 7 but this showing is to be considered as exemplary only as this particular type of swivel wheel forms no part of this present invention.

Figure 5:
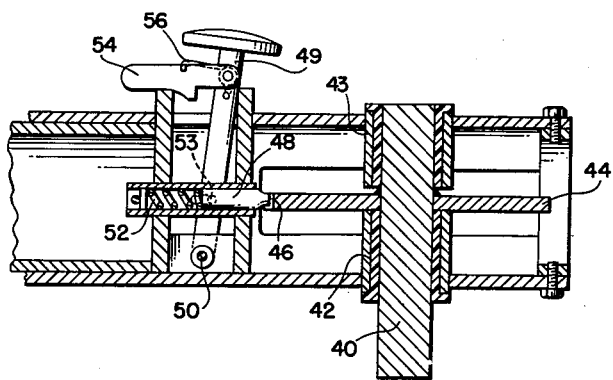
FIGURE 5 is an exemplary showing of a locking means for securing the swivel wheels in a locked position and with means to free them when desired.
Figure 7:
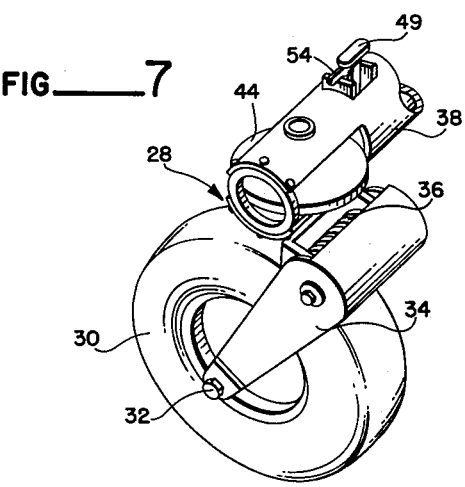
FIGURE 7 is a perspective view illustrating a preferred type of wheel and mounting means for the same.

Referring to FIGURE 7, an automotive type wheel and tire is shown at 30. The spindle 32 for wheel 30 is preferably mounted in a fork member 34 as illustrated in this particular showing. Resilient means, as the spring 36, resiliently couples fork 34 to bracket member 38. It is desired to point out again that this particular form of bracket is not critical with this present invention. It merely provides a convenient means for one type of pivot, consisting of the shaft 40 which is journaled within bracket 38 as on bearings 42 and 43. One suitable form of locking means is shown in FIGURE 5 so that the wheel assembly may be locked against swiveling when the towing vehicle is going forward. This coacting locking means consists of a guiding member 44 notched at 46 to receive a spring urged pawl 48. A lever is pivoted to a fixed pivot at 50 and pivoted on a floating pivot to pawl 48 at 53 to overcome spring 52 and release the wheel so it may swivel. A latch means 54 is provided to hold the pawl in its released position and a continuity of this holding action is assured by the spring bias provided by spring 56.

In order to control the trailer when it is being backed, and with the swivel wheels unlocked for this purpose, the bar and strut mechanism illustrated most fully in FIGURES 1 and 4 is provided. The rigid longitudinal strut members 60 are pivotably secured at their normally forward ends by a pivot bolt 62 passing through a clevis 63 which in turn is secured to member 60. This pivot joint, in addition to pivoting in a horizontal plane, must be capable of considerable movement in the vertical plane so that as the automobile goes over a rise in the ground or through a depression there will be no binding as the horizontal planes of the trailer and the automobile form various vertical angles with each other. At the normally rear ends, struts 60 are pivotably secured to the transverse bar 65 at 66. This joint, like the forward one, must be capable of reasonable movement in the vertical plane as well as having a wide range of pivoting in the horizontal plane for the reasons noted. Transverse bar 65 is pivoted near its center at 68, thus forming a balanced compensating means for the strut members as the prime mover negotiates turns. This pivot should also be substantially on the longitudinal axis of the trailer.

When it is desirable to back the trailer by means of the prime mover to which it is attached, this invention contemplates that the wheels 26 and 28 will be unlocked so that they may swivel about their vertical axes, and at the same time, in order to fix the longitudinal axis of the trailer substantially coaxially with the prime mover, means are provided for in effect coupling the longitudinal strut member 60 fixedly to the sides of the trailer. This is accomplished preferably by securing the ends of the transverse bar 65 to each side of the trailer, although in some uses of short duration it may be desirable to engage locking means only on one side. One workable arrangement of such a locking means is shown throughout the present drawings and consists of a toothed member 70 which is preferably hingedly secured to the frame side members 12 or 14. The form of this comb member must be adaptable for coaction with the form of the transverse bar 65. Throughout the present drawings a channel shaped bar 65 is illustrated with the legs of the channel, 72 and 73, directed as is best illustrated in FIGURE 3. These legs, as will be true of various other structural shapes present a thin metal ridge normally substantially ¼ of an inch in thickness. In such a case the opening between the teeth of comb 70 can be narrow and have narrow spaces between the teeth wide enough to snugly engage said legs, preferably pointed as illustrated so that engagement can be made over quite a range of angular positioning of bar 65 with respect to comb 70. It is not essential in the operation of this equipment for the trailer to be exactly coaxially disposed with the prime mover when the trailer is being backed. It is, however, very essential that once the backing operation is started, the relationship between the trailer and the prime mover should be fixed and thus take fullest advantage of the swiveling effect of wheels 26 and 28. It will be believed apparent that the length of comb 70 should be sufficient to cover the range of angular displacement which may be expected under the conditions the equipment is to serve.

Figure 6:
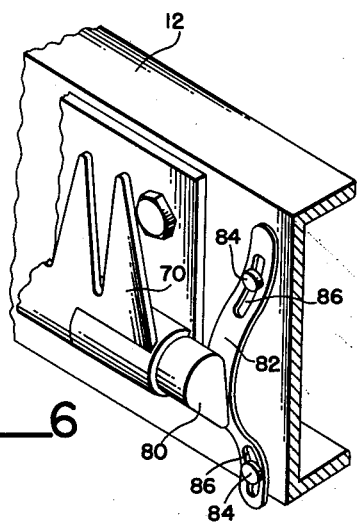
FIGURE 6 is a perspective view showing a portion of the comb type locking means and illustrating the cam and spring means employed to hold the comb in locked or unlocked position.

In order to hold comb member 70 in either its engaged or disengaged position, a positioning means of the type illustrated in FIGURE 6 will be found very simple and dependable in operation. Referring to FIGURE 6, a cam 80 is provided which is fixedly secured with respect to comb member 70, preferably with its transverse axis substantially in the plane of comb 70. A spring member 82 is provided which is bowed at its center and provided with headed retaining means 84 at each end and in order to take care of the elongation of the spring when it is compressed slots are provided at 86.

It is believed that it will be clearly apparent from the above description and the disclosure in the drawings that the invention comprehends a novel construction of an automotive trailer.

Having thus described my invention, I claim:

1. A trailer having swivel wheels, intended for use with automotive prime movers, comprising: a trailer frame having means at its forward end for coupling to a prime mover; a swivel wheel operatively secured to each side of said frame and disposed to pivot on a substantially vertical axis; coacting locking means to selectively lock said swivel wheel with its plane of rotation substantially parallel to the longitudinal axis of said trailer; a transverse bar pivoted substantially on the longitudinal axis of said frame; rigid longitudinal strut members disposed substantially parallel to each other and on opposite sides of said frame and each pivoted at one end to an end of said transverse bar and at the other end to a prime mover, and comb type means for locking said transverse bar against movement around its pivot, when it is desired to back said trailer.

2. In combination with the subject matter of claim 1, said rigid longitudinal strut members pivotably secured at each end, one to said transverse bar and one to said prime mover, by pivot means permitting relative movement between the trailer and its prime mover in the horizontal plane and in the vertical plane.

3. A trailer having swivel wheels, intended for use with automotive prime movers, comprising: a trailer frame having means at its forward end for coupling to a prime mover; a fork supported swivel wheel secured by bracket means to each side of said frame and disposed to pivot about a vertical axis; a wheel supporting bracket secured to each side of said frame; a swiveling wheel fork resiliently supported by said bracket; an automotive type wheel and tire operatively supported by said fork; coacting locking means on said fork and on said bracket to selectively lock or unlock said swivel wheel; a transverse bar pivoted substantially on the longitudinal axis of said frame; rigid longitudinal members disposed on opposite sides of said frame and each pivoted at one end to an end of said transverse bar and at the other end to a prime mover, and comb type means for locking said transverse bar against movement around its pivot when it is desired to back said trailer.

4. The combination according to claim 3 wherein said transverse bar has outstanding thin leg portions, and said comb type locking means having a plurality of teeth terminating in pointed ends to direct the said legs into the narrow spaces between said teeth as the locking means is being engaged.

5. The combination according to claim 3, wherein said transverse bar has one of said strut members pivotably secured at each of its opposite ends and providing in coaction with said comb type locking means, means for fixedly coupling the trailer to said prime mover and fixing the angular relationship between the longitudinal axes of said trailer and said prime mover.

References Cited in the file of this patent

UNITED STATES PATENTS

| | | |
|---|---|---|
| 2,225,130 | Otto et al. | Dec. 17, 1940 |
| 2,475,174 | Boone | July 5, 1949 |
| 2,667,366 | Otjen | Jan. 26, 1954 |
| 2,712,945 | Peterson | July 12, 1955 |